(12) United States Patent
Kobayashi et al.

(10) Patent No.: US 10,897,134 B2
(45) Date of Patent: Jan. 19, 2021

(54) ELECTRONIC DEVICE

(71) Applicant: ROHM CO., LTD., Kyoto (JP)

(72) Inventors: Shinya Kobayashi, Kyoto (JP); Takayuki Kamei, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 160 days.

(21) Appl. No.: 16/045,101

(22) Filed: Jul. 25, 2018

(65) Prior Publication Data

US 2019/0036332 A1   Jan. 31, 2019

(30) Foreign Application Priority Data

Jul. 28, 2017   (JP) .................. 2017-146894

(51) Int. Cl.
| | |
|---|---|
| *H02K 7/00* | (2006.01) |
| *H02J 7/14* | (2006.01) |
| *H02J 1/10* | (2006.01) |
| *H02J 1/14* | (2006.01) |
| *H02J 7/00* | (2006.01) |
| *H02J 1/08* | (2006.01) |
| *H02M 1/10* | (2006.01) |

(52) U.S. Cl.
CPC .............. *H02J 1/102* (2013.01); *H02J 1/08* (2013.01); *H02J 1/14* (2013.01); *H02J 7/0024* (2013.01); *H02J 7/0068* (2013.01); *H02J 7/00* (2013.01); *H02J 2207/20* (2020.01); *H02M 1/10* (2013.01)

(58) Field of Classification Search
USPC ........................................................ 320/121
See application file for complete search history.

(56) References Cited

U.S. PATENT DOCUMENTS

| | | | | |
|---|---|---|---|---|
| 5,319,536 | A * | 6/1994 | Malik ............... | H02J 1/102 363/65 |
| 2009/0102427 | A1* | 4/2009 | Tamegai ............ | H02J 7/00309 320/138 |
| 2009/0174366 | A1* | 7/2009 | Ahmad .............. | H02J 2207/40 320/114 |
| 2010/0244774 | A1* | 9/2010 | Lu .................... | H02J 2207/40 320/138 |
| 2014/0266011 | A1* | 9/2014 | Mehta ............... | H02J 7/0042 320/107 |
| 2015/0309522 | A1* | 10/2015 | Fang ................. | G05B 15/02 700/22 |
| 2016/0218521 | A1* | 7/2016 | Huang ............... | H02J 7/025 |
| 2016/0380455 | A1* | 12/2016 | Greening ........... | H02J 7/0044 320/114 |
| 2017/0346298 | A1* | 11/2017 | Chuang .............. | G05F 5/00 |
| 2018/0026450 | A1* | 1/2018 | Moriyama ......... | H02H 7/1213 307/51 |

FOREIGN PATENT DOCUMENTS

JP          2017038429 A       2/2017

* cited by examiner

*Primary Examiner* — Alexis B Pacheco
(74) *Attorney, Agent, or Firm* — Cantor Colburn LLP

(57) ABSTRACT

The present disclosure provides electronic devices that effectively utilize multiple ports. A first input switch is provided between a first port and an input of a first switching converter. A second input switch is provided between a second port and an input of a second switching converter. A load is connected to an output of the first switching converter. A first load switch is provided between the output of the first switching converter and a battery, and a second load switch is provided between an output of the second switching converter and the battery.

12 Claims, 14 Drawing Sheets

ELECTRONIC DEVICE

CROSS-REFERENCE TO RELATED APPLICATIONS

The present application claims priority under 35 U.S.C. § 119 to Japanese patent Application No. 2017-146894 filed on Jul. 28, 2017, the content of which is incorporated herein by reference.

TECHNICAL FIELD

The present disclosure relates to a charging system for electronic devices.

DISCUSSION OF THE BACKGROUND

Battery-driven devices, such as mobile phones, smart phones, tablets, notebooks, portable music players, are equipped with rechargeable, secondary batteries and charging circuits for charging the same. The charging circuits charges the secondary battery using the direct current (DC) voltage (bus voltage, $V_{BUS}$) supplied from an external source through the Universal Serial Bus (USB) cable or the DC voltage from an external alternating current (AC) adaptor.

Prior Technical Literature

Patent Literature

[Patent literature 1] The specification of Japan patent application publication No. 2017-38429.

SUMMARY

Problems to be Solved in the Present Invention

In recent years, there are more and more electronic devices having multiple ports in the market. Take the USB port as an example, the electronic machine can supply the BUS power to a plurality of external devices respectively connecting to the USB ports.

Nonetheless, in the case where the USB port is connected with a plurality of power supply devices (e.g., adaptors or batteries), only the power supplied from one of the power supply devices can be used to charge the battery built-in the electronic device. In other words, the multiple ports are not utilized effectively.

The present invention is proposed to address this situation, and one illustrative purpose of the present disclosure is to provide a charging system that can effectively utilize a plurality of ports.

Technical Means for Solving Problems

The electronic device according to one aspect of the present invention comprises, a first port; a second port; a first switching converter, wherein an output of the first switching converter connects to a load; a second switching converter; a first input switch, provided between the first port and an input of the first switching converter; a second input switch, provided between the second port and an input of the second switching converter; a first load switch, provided between the output of the first switching converter and a battery; a second load switch, provided between an output of the second switching converter and the battery; a first controller, configured to control the first switching converter, the first input switch, the first load switch; and a second controller, configured to control the second switching converter, the second input switch, and the second load switch.

Further, effective aspects of present invention also comprise any combinations of the above-mentioned constituting elements; alternatively, effective aspects of present invention also comprise the substitution among the constituting elements of the present invention and their applications in methods, devices, systems, etc.

Effects of the Present Invention

According to one aspect of the present invention, it is feasible to effectively utilize a plurality of ports.

DETAILED DESCRIPTION

The present invention is described hereinbelow based on preferred embodiments thereof by referencing to the appended drawings. Same or equivalent constituting elements, components and processes across various drawings are designated with the same or similar reference symbols, and repeated description thereof may be omitted where suitable. Also, the embodiments are provided for illustrative purposes and should not be construed to limit the scope of the claimed invention, while not all the features or combinations thereof are necessarily the essence of the claimed invention.

In this specification, the description regarding the status that "a component A is connected with/to a component B" includes not only the physical and direct connection between the component A and the component B, but also the indirect connection between the component A and the component B; as long as such indirect connection does not substantially affect the electric connection status therebetween or the functionality attained by such connection.

Similarly, the description regarding the status that "a component C is disposed between a component A and a component B" includes not only the physical and direct connection between the component A and the component C or between the component B and the component C, but also the indirect connection therebetween; as long as such indirect connection does not substantially affect the electric connection status therebetween or the functionality attained by such connection.

First Embodiment

Figure 1:
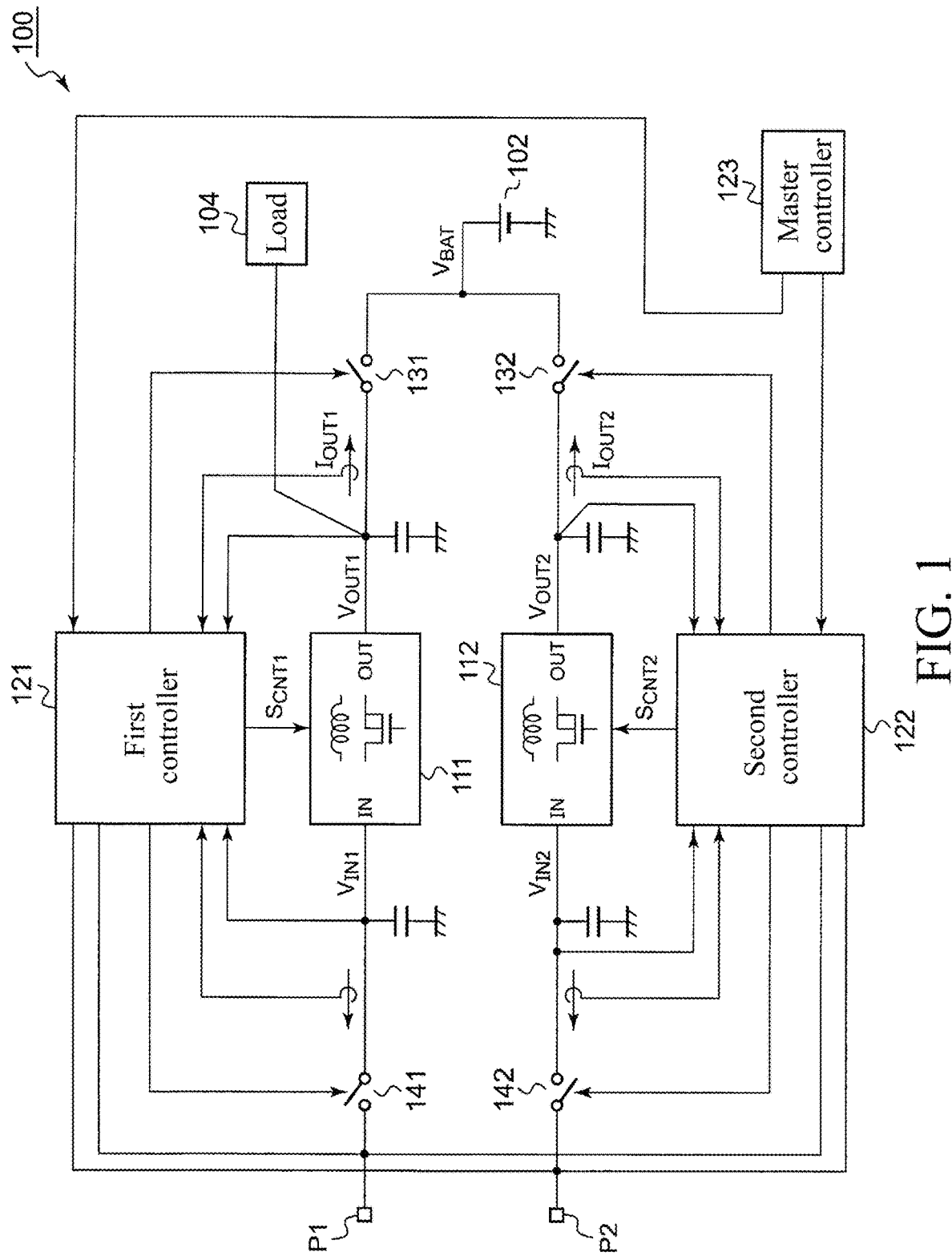
FIG. 1 is a block diagram of an electronic device according to a first embodiment of the present disclosure.

FIG. 1 is a block diagram of an electronic device 100 according to a first embodiment of the present disclosure. The electronic device 100 can be a battery-driven device, such as, a laptop, tablet terminal, smart phone, portable music player, digital camera, digital video recorder.

The electronic device 100 comprises a first port P1, a second port P2, a battery 102, a load 104, a first switching converter 111, a second switching converter 112, a first controller 121, a second controller 122, a first load switch 131, a second load switch 132, a first input switch 141, and a second input switch 142.

A power supply device capable of supplying power to the electronic device 100 or a power intake device capable of receiving power supply from the electronic device 100 for its operation is connected to the first port P1 and the second port P2. The power supply device includes an adapter.

The battery 102 is a secondary battery, such as a lithium ion or lithium polymer battery.

The first switching converter 111 and the second switching converter 112 are any of a boost converter, a buck converter, and a boost/buck converter. In the following description, the first switching converter 111 and the second switching converter 112 are the same as the boost/buck converter, but they may have different configurations in other embodiments.

The first switching converter 111 has an input IN and an output OUT, which are respectively connected with a smoothing capacitor. Further, the names of the input IN and output OUT are used for the sake of convenience. That is, the first switching converter 111 operates in both a forward mode in which the electric power is transmitted from the input IN side to the output OUT side and in a reverse mode in which the electric power is transmitted from the output OUT side to the input IN side. The same applies to the second input switch 142.

The first input switch 141 is provided between the first port P1 and the input IN of the first switching converter 111. The second input switch 142 is provided between the second port P2 and the input IN of the second switching converter 112.

The load 104 connects with the output OUT of the first switching converter 111. The load 104 is a circuit block that receives the power supply from the outside or the power supply from the battery 102, and its configuration and function varies depending on the type of the electronic device 100. In the case of a common electronic device, the load 104 includes (i) a microcomputer, a CPU (central processing unit), a display and a driver thereof, and an audio circuit, and (ii) a DC/DC converter and a linear regulator.

The first load switch 131 is provided between the output OUT of first switching converter 111 and the battery 102.

The second load switch 132 is provided between the output OUT of the second switching converter 112 and the battery 102.

The first controller 121 is configured to control the first switching converter 111, the first input switch 141, and the first load switch 131. The first controller 121 is configured to control the first switching converter 111 to switch between the forward mode and the reverse mode.

The forward mode operates in a constant current (CC) mode and constant voltage (CV) mode. In the CC mode, the first controller 121 generates the control pulse $S_{CNT1}$ by feedback to drive the first switching converter 111, wherein the feedback is resulted from a charge current (the output current of the first switching converter 111) $I_{OUT1}$ that flows to the battery 102 with the current level approaching a predetermined value.

In the CV mode, the first controller 121 generates the control pulse $S_{CNT1}$ by feedback to drive the first switching converter 111, wherein the feedback is resulted from a voltage (in other words, the output voltage $V_{OUT1}$ of the first switching converter 111) $V_{BAT}$ of the battery 102 with the voltage level approaching a predetermined value.

In the reverse mode, the first controller 121 generates the control pulse $S_{CNT1}$ by feedback to drive the first switching converter 111, wherein the feedback is resulted from a voltage $V_{BAT}$ of the input IN of the first switching converter 111 with the voltage level approaching a predetermined value.

The same also applies to the second controller 122, in which the second controller 122 is configured to control the second switching converter 112, the second input switch 142, and the second load switch 132.

The electronic device 100 may further comprise a master controller 123 in charge of controlling the electronic device 100. The master controller 123 is a microprocessor or CPU, which may control the first controller 121 and the second controller 122 depending on the presence or absence of a device connecting to the first port P1 or the second port P2. It is also feasible to omit said master controller 123, and instead, installing the functionality of the master controller in the first controller 121 and the second controller 122.

Now that the structure of the electronic device 100 has been described, the action performed by the electronic device is discussed below.

The electronic device 100 operates in any one of the first state φ1 to the seventh state φ7. The state is determined by the master controller 123 and notified to the first controller 121 and the second controller 122.

The first state φ1
The first port P1: connected with the power supply device
The second port P2: not connected
The second state φ2
The first port P1: not connected
The second port P2: connected with the power supply device
The third state φ3
The first port P1: connected with the power supply device
The second port P2: connected with the power intake device
The fourth state φ4
The first port P1: connected with the power intake device
The second port P2: connected with the power supply device
The fifth state φ5
The first port P1: connected with the power supply device
The second port P2: connected with the power supply device The sixth state φ6
The first port P1: connected with the power intake device
The second port P2: connected with the power intake device
The seventh state φ7
The first port P1: not connected
The second port P2: not connected Next, the operation modes of the electronic device 100 are discussed below.

(The First Operation Mode)

The first operation mode MODE1 is selectable under the first state φ1. Under the first state φ1, the power supply device 201 supplies the charging voltage $V_{CHG1}$ to the first port P1.

Figure 2:
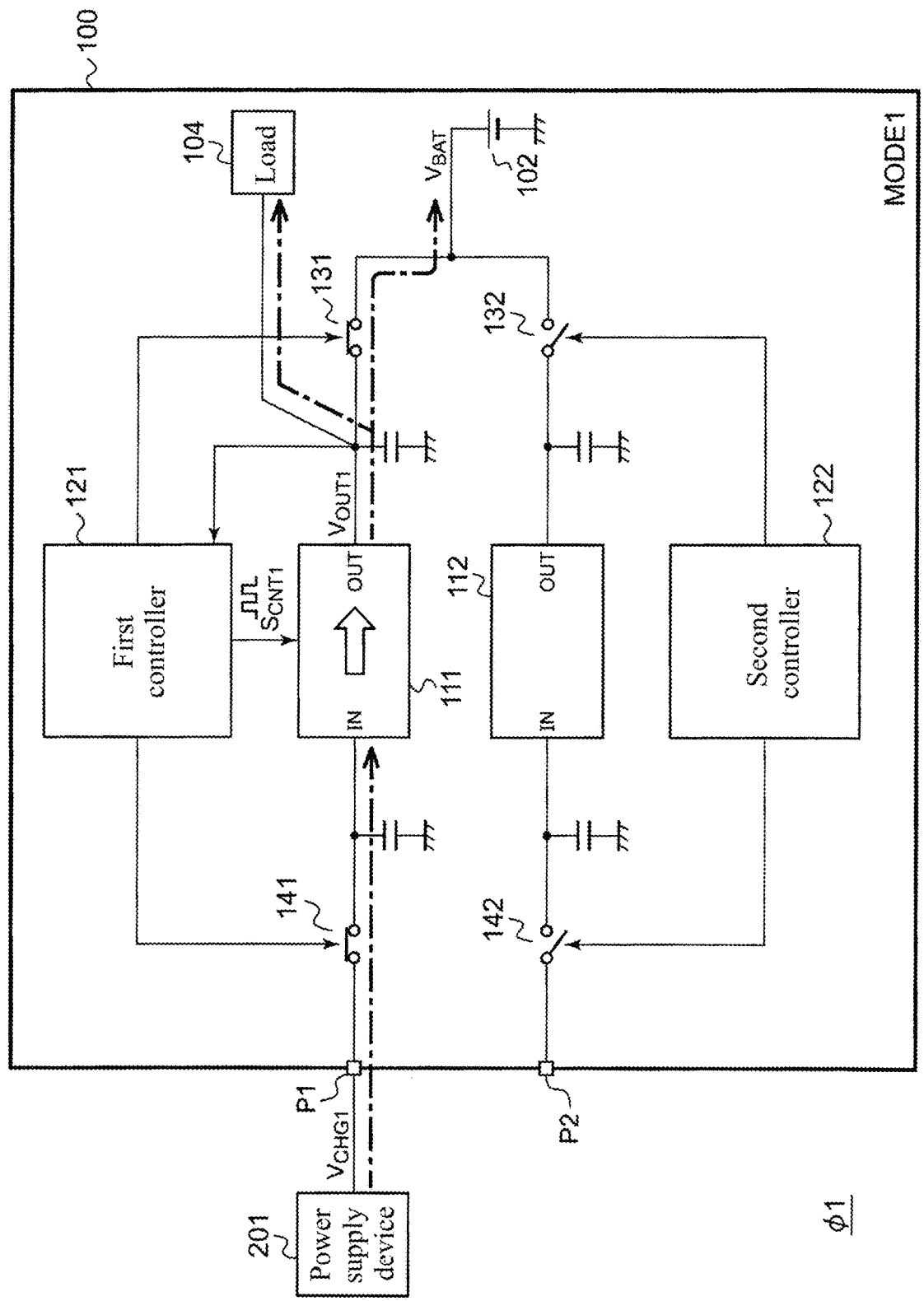
FIG. 2 is an equivalent-circuit diagram of an electronic device under a first operation mode.

FIG. 2 is an equivalent-circuit diagram of an electronic device 100 under the first operation mode. The first controller 121 turns on the first input switch 141 and the first load switch 131, so that the first switching converter 111 operates in the forward mode. At the output OUT of the first switching converter 111, a stabilized output voltage $V_{OUT1}$ is generated and supplied to the load 104. When $V_{CHG1} > V_{BAT}$, the first switching converter 111 operates in the buck operation mode; when $V_{CHG1} < V_{BAT}$, the first switching converter 111 operates in a boost operation mode.

Further, the first load switch 131 may optionally charge the battery 102. Alternatively, it is also feasible to supply the power from the battery 102 to the load 104 via the first load switch 131.

The second controller 122 turns off the second input switch 142 and the second load switch 132, and the second controller 122 stops.

(The Second Operation Mode)

The second operation mode MODE2 is selectable under the second state φ2. Under the second state φ2, the power supply device 202 supplies the charging voltage $V_{CHG2}$ to the second port P2.

Figure 3:
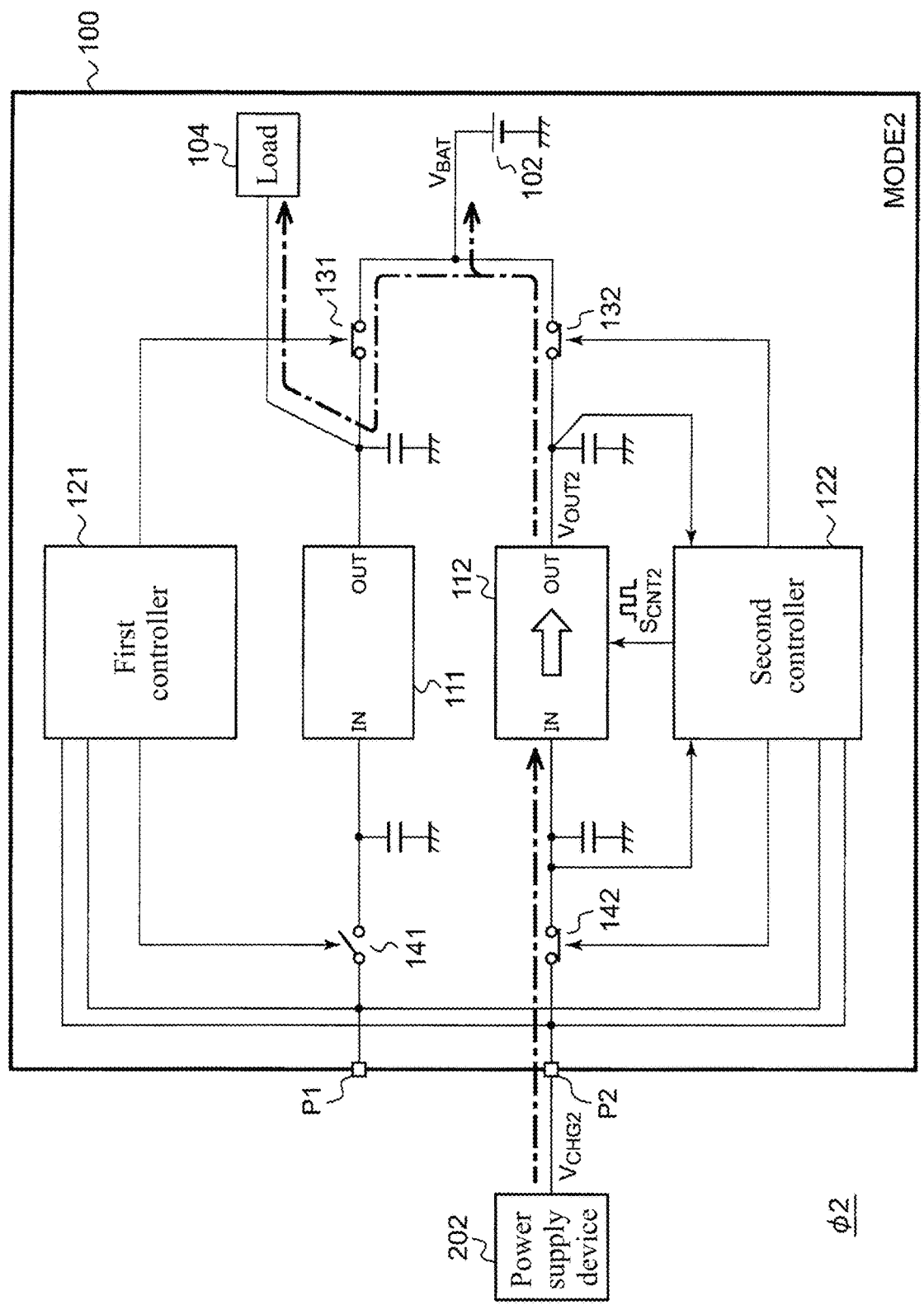
FIG. 3 is an equivalent-circuit diagram of an electronic device under a second operation mode.

FIG. 3 is an equivalent-circuit diagram of an electronic device 100 under the second operation mode. The first controller 121 turns off the first input switch 141 and the first switching converter 111, and turns on the first load switch 131. The second controller 122 turns on the second input switch 142 and the second load switch 132, so that the second switching converter 112 operates in the forward mode. A stabilized output voltage $V_{OUT2}$ is generated at the output OUT of the second switching converter 112. The output voltage $V_{OUT2}$ is supplied to the load 104 via the second load switch 132 and the first load switch 131. When $V_{CHG2} > V_{BAT}$, the second switching converter 112 operates in the buck operation mode; when $V_{CHG2} < V_{BAT}$, the second switching converter 112 operates in the boost operation mode.

The battery 102 is optionally charged. Alternatively, it is also feasible to supply the power from the battery 102 to the load 104 via the first load switch 131.

(The Third Operation Mode)

The third operation mode MODE3 is selectable under the third state φ3. Under the third state φ3, the charging voltage $V_{CHG1}$ is supplied to the first port P1, and the second port P2 supplies the voltage $V_{SUP2}$ to the power intake device 203.

Figure 4:
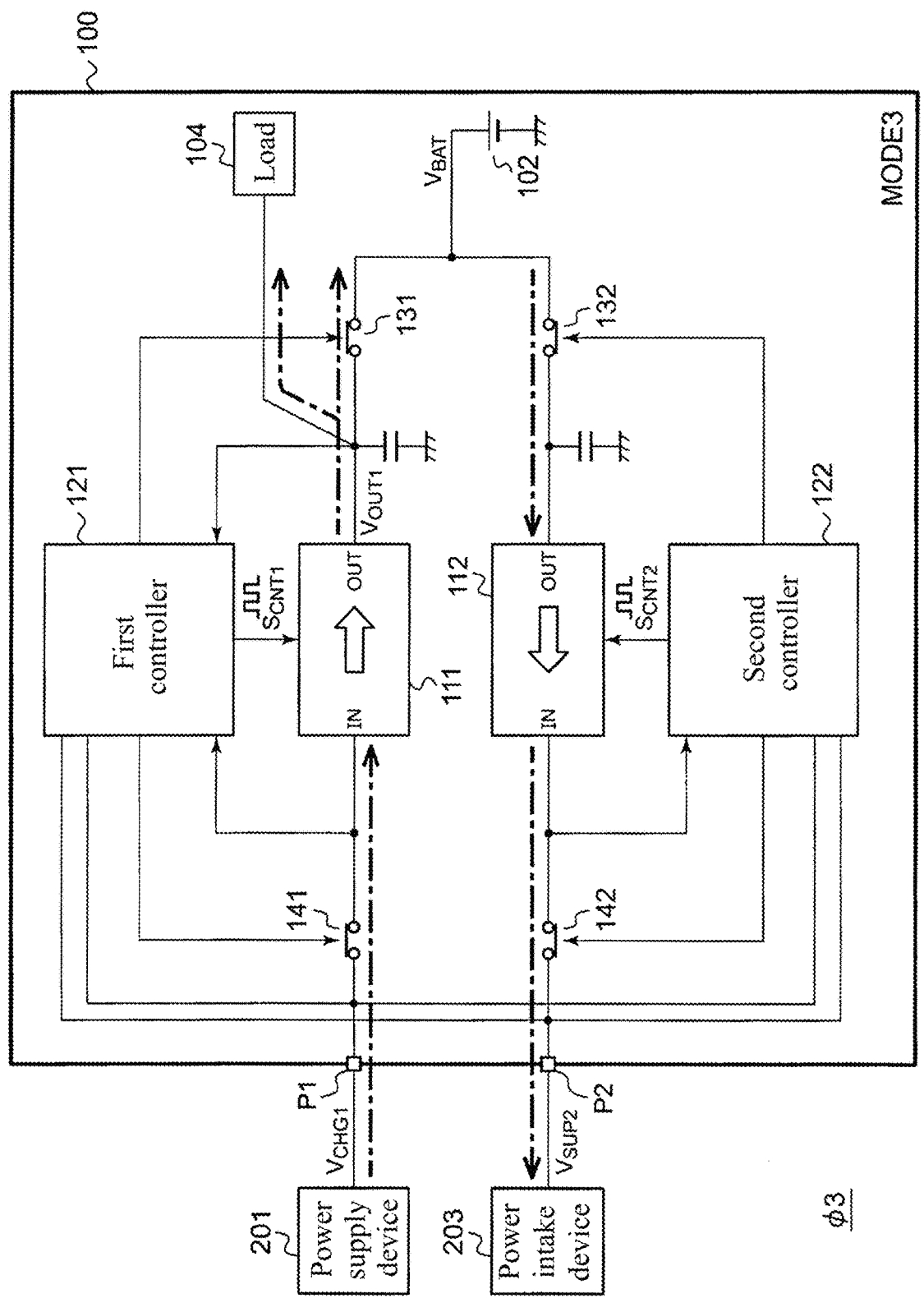
FIG. 4 is an equivalent-circuit diagram of an electronic device under a third operation mode.

FIG. 4 is an equivalent-circuit diagram of an electronic device 100 under the third operation mode. The first controller 121 turns on the first input switch 141 and the first load switch 131, so that the first switching converter 111 operates in the forward mode. A stabilized output voltage $V_{OUT1}$ is generated at the output OUT of the first switching converter 111. The output voltage $V_{OUT1}$ is supplied to the load 104.

The second controller 122 turns on the second input switch 142 and the second load switch 132. The output voltage $V_{OUT1}$ is supplied to the output OUT of the second switching converter 112 via the first load switch 131 and the second load switch 132. The second controller 122 makes the second switching converter 112 operate in the reverse mode, so that the input IN of the second switching converter 112 generates the voltage $V_{SUP2}$ having the voltage level required by the power intake device 203.

The battery 102 is optionally charged. Alternatively, it is also feasible to supply the power from the battery 102 to the second switching converter 112 via the second load switch 132.

(The Fourth Operation Mode)

The fourth operation mode MODE4 is selectable under the fourth state φ4. Under the fourth state φ4, the charging voltage $V_{CHG2}$ is supplied to the second port P2s, and the first port P1 supplies the voltage $V_{SUP1}$ to the power intake device 204.

Figure 5:
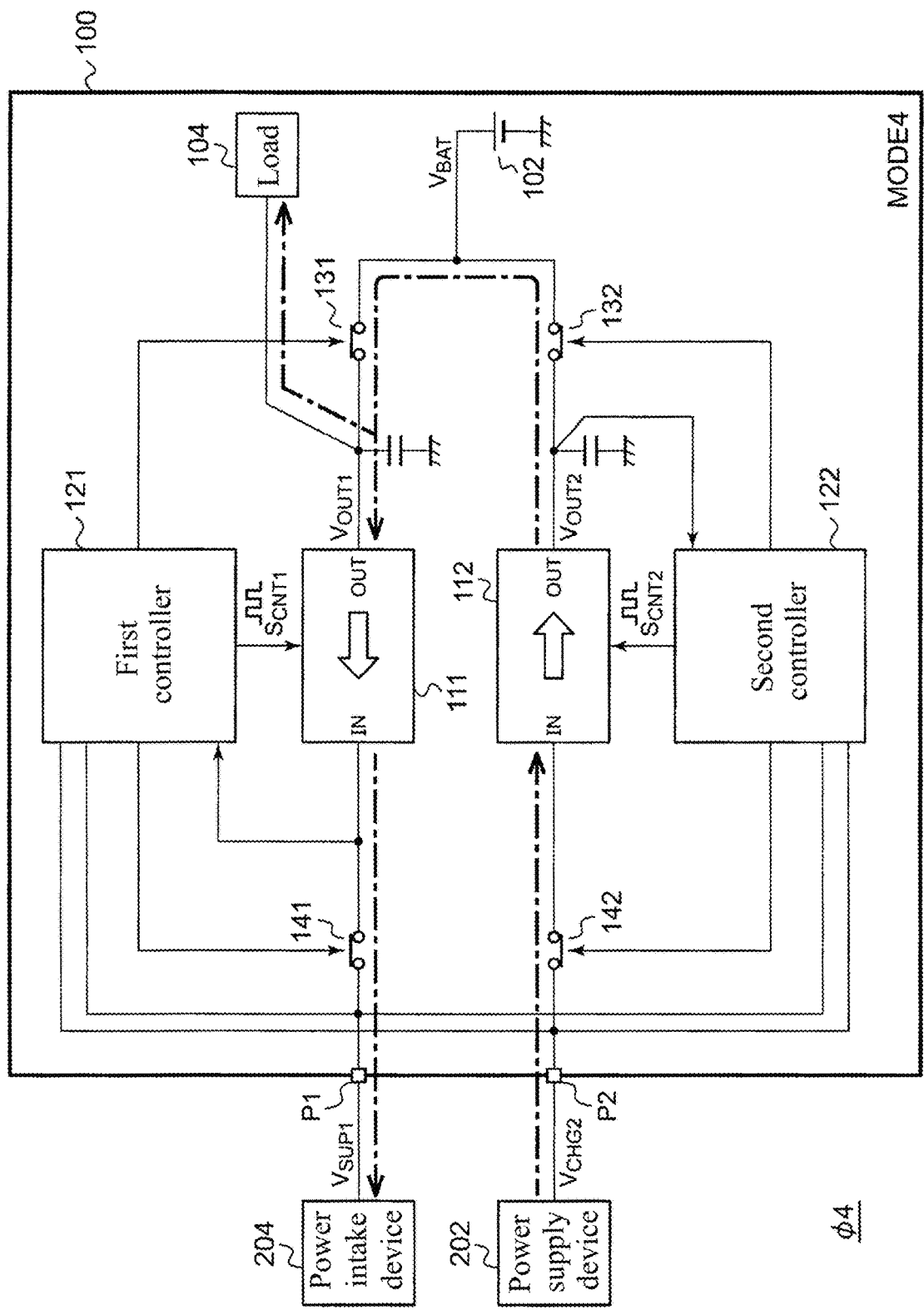
FIG. 5 is an equivalent-circuit diagram of an electronic device under a fourth operation mode.

FIG. 5 is an equivalent-circuit diagram of an electronic device 100 under the fourth operation mode. The second controller 122 turns on the second input switch 142 and the second load switch 132, so that the second switching converter 112 operates in the forward mode. A stabilized output voltage $V_{OUT2}$ is generated at the output OUT of the second switching converter 112.

The first controller 121 turns on the first input switch 141 and the first load switch 131. The output voltage $V_{OUT2}$ is supplied to the load 104 via the second load switch 132 and the first load switch 131.

Also, the output voltage $V_{OUT2}$ is supplied to the output OUT of the first switching converter 111. The first controller 121 makes the first switching converter 111 operate in the reverse mode, so that the input IN of the first switching converter 111 generates the voltage $V_{SUP1}$ having the voltage level required by the power intake device 204.

The battery 102 is optionally charged. Alternatively, it is also feasible to supply the power from the battery 102 to the first switching converter 111 via the first load switch 131.

(The Fifth Operation Mode)

The fifth operation mode MODE5 is selectable under the fifth state φ5. Under the fifth state φ5, the charging voltage $V_{CHG1}$ is supplied to the first port P1, and the charging voltage $V_{CHG2}$ is supplied to the second port P2.

Figure 6:
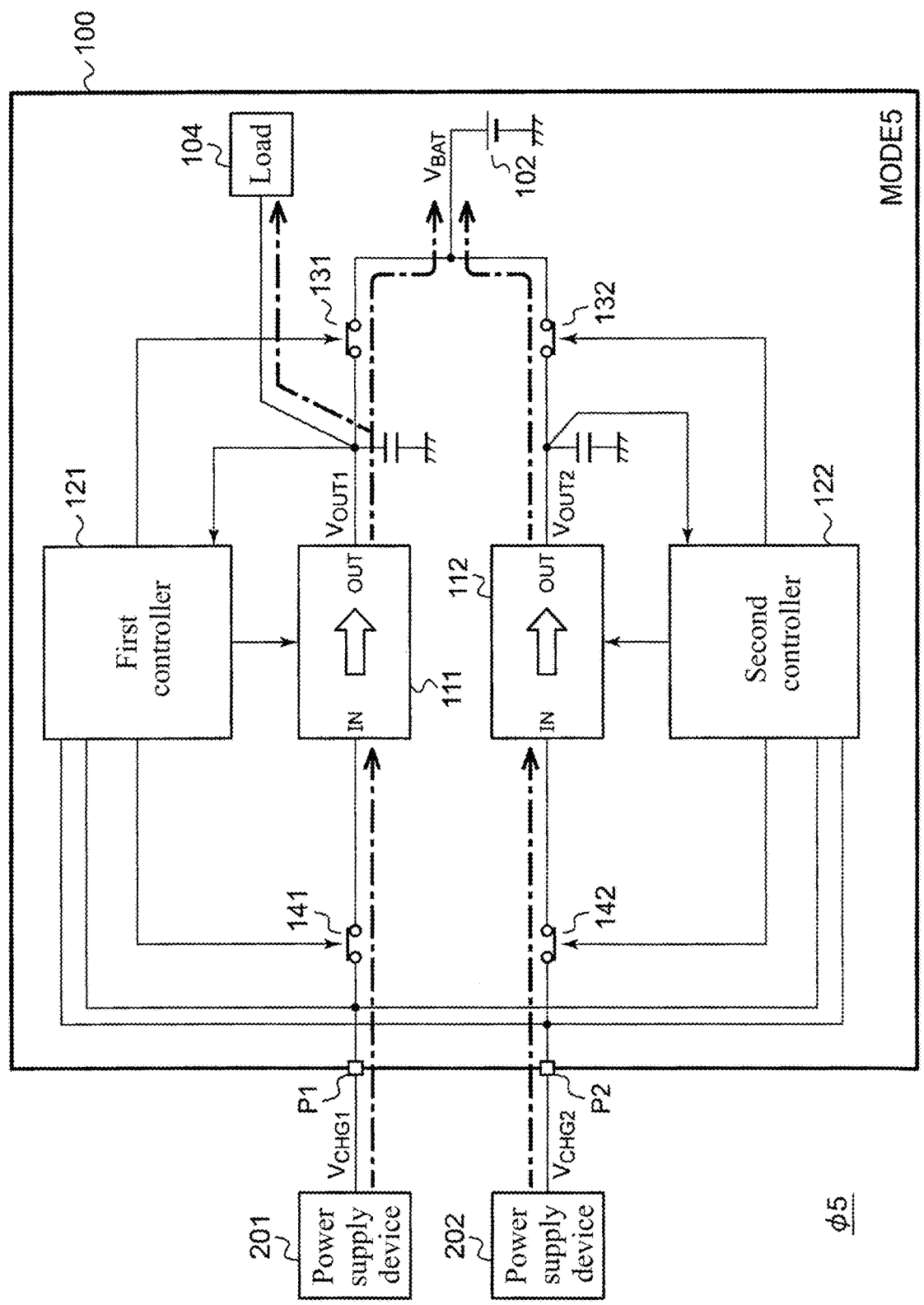
FIG. 6 is an equivalent-circuit diagram of an electronic device under a fifth operation mode.

FIG. 6 is an equivalent-circuit diagram of an electronic device 100 under the fifth operation mode. The first controller 121 turns on the first input switch 141 and the first load switch 131, so that the first switching converter 111 operates in the forward mode, and the output OUT of the first switching converter 111 generates a stabilized output voltage $V_{OUT1}$. The output voltage $V_{OUT1}$ is supplied to the load 104.

The second controller 122 turns on the second input switch 142 and the second load switch 132, so that the second switching converter 112 operates in the forward mode, and the output OUT of the second switching converter 112 generates a stabilized output voltage $V_{OUT2}$.

Under the fifth operation mode MODE5, the combined current of the output current of the first switching converter 111 and the output current of the second controller 122 is used to charge the battery 102. This is also referred to as a dual-port input high-current charging mode.

Moreover, under the fifth state φ5, it is also feasible to use one of the first controller 121 and the second switching converter 112 for charging (single-charging mode).

(The Sixth Operation Mode)

The sixth operation mode MODE6 is selectable under the sixth state φ6. Under the sixth state φ6, the first port P1 supplies the voltage $V_{SUP1}$ to the power intake device 204, and the second port P2 supplies the voltage $V_{SUP2}$ to the power intake device 203.

Figure 7:
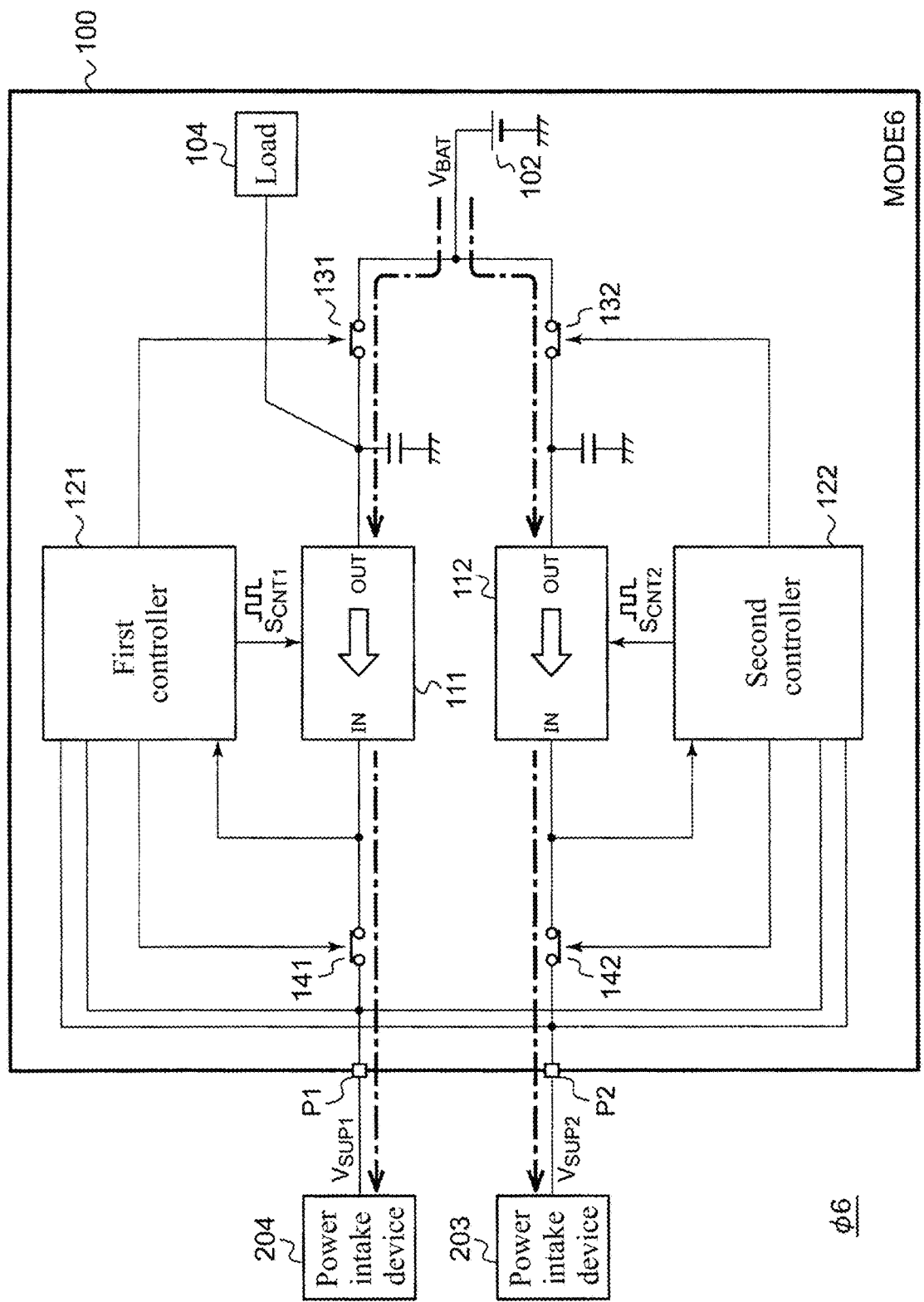
FIG. 7 is an equivalent-circuit diagram of an electronic device under a sixth operation mode.

FIG. 7 is an equivalent-circuit diagram of an electronic device 100 under the sixth operation mode. The first controller 121 turns on the first load switch 131 and the first input switch 141. The battery voltage $V_{BAT}$ is supplied to the output OUT of the first switching converter 111. The first controller 121 makes the first switching converter 111 operate in the reverse mode, and makes the input IN generate the voltage $V_{SUP1}$ having the voltage level required by the power intake device 204.

Similarly, the second controller 122 turns on the second load switch 132 and the second input switch 142. The battery voltage $V_{BAT}$ is supplied to the output OUT of the second switching converter 112. The second controller 122 makes the second switching converter 112 operate in the reverse mode, and makes the input IN generate the voltage $V_{SUP2}$ having the voltage level required by the power intake device 203.

Also, the battery 102 is supplied to the load 104 via the first load switch 131.

When only the power receiving device 204 is connected, the second input switch 142 and the second load switch 132 are turned off, and the second switching converter 112 is stopped.

Conversely, when only the power receiving device 203 is connected, the first input switch 141 and the first switching converter 111 are stopped. The first load switch 131 is turned on to supply the power to the load 104.

(The Seventh Operation Mode)

Figure 8:
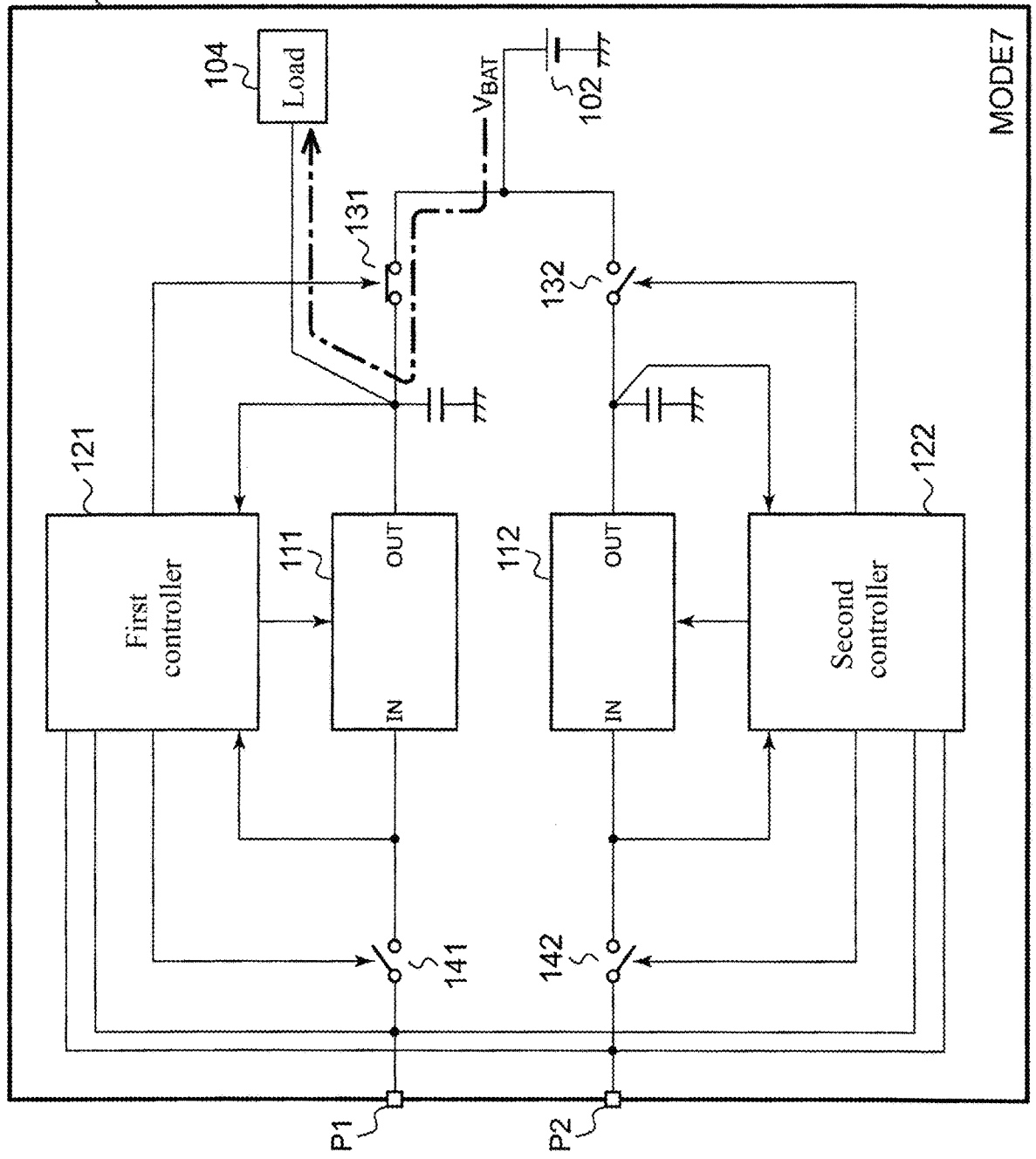
FIG. 8 is an equivalent-circuit diagram of an electronic device under a seventh operation mode.

The seventh operation mode MODE7 is selectable under the seventh state φ7. FIG. 8 is an equivalent-circuit diagram of an electronic device 100 under the seventh operation mode. The first controller 121 turns on the first load switch 131, and turns of the first input switch 141, thereby making the first switching converter 111 stop. The second controller 122 turns off the second load switch 132 and the second input switch 142, thereby making the second switching converter 112 stop. In this way, the battery voltage $V_{BAT}$ is supplied to the load 104 via the first load switch 131.

The above is the operation modes that are supported by the electronic device 100.

According to the electronic device 100, a plurality of ports can be fully utilized by switching between a plurality of modes. In particular, under the fifth state φ5 as shown in FIG. 6, by selecting the fifth mode MODE5, it is possible to charge the battery 102 with a larger current by operating the two switching converters in parallel. As a result, the charging time can be shortened as compared with the case where only a single switching converter is used.

Figure 9:
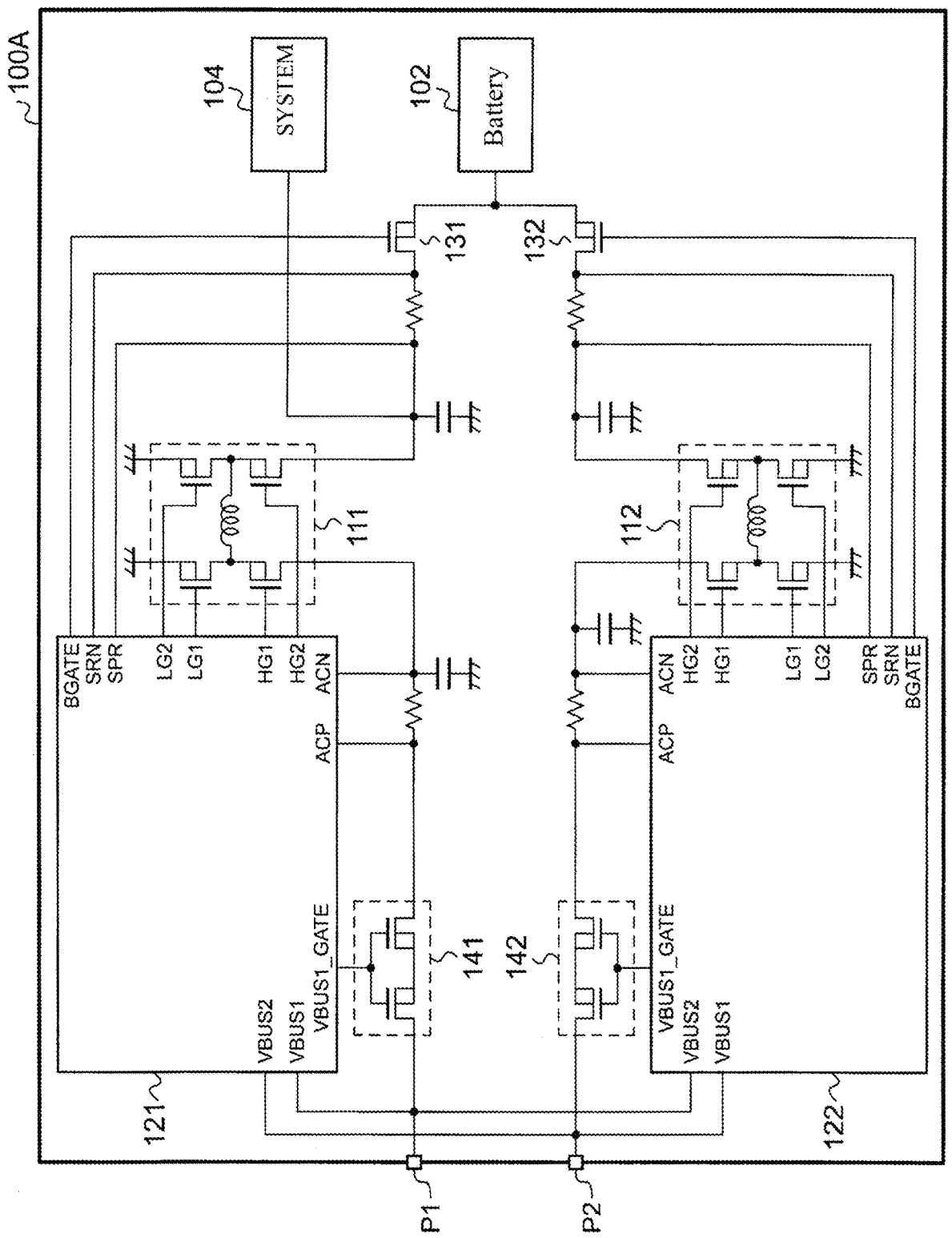
FIG. 9 is a circuit diagram of an electronic device according to one embodiment.

Next, an example of the specific configuration of the electronic device 100 will be described. FIG. 9 is a circuit diagram of an electronic device 100A according to one embodiment. The first switching converter 111 and the second switching converter 112 are boost/buck converters.

The first input switch 141 is a series connection of two N-channel MOS (metal oxide semiconductor) transistors. The same also applies to the second input switch 142. The first load switch 131 and the second load switch 132 are N-channel MOS transistors connected in series.

The first controller 121 and the second controller 122 are the same chip. Control pulses $S_{CNT}$ are outputted from the HG1, HG2, LG1, and LG2 pins. The SRN and SPR pins are connected to the sense resistor on the output side and can detect the output voltage $V_{OUT}$ and the output current $I_{OUT}$. The ACP and ACN pins are connected to the sense resistor on the input side and can detect the input voltage and the input current.

The electronic device 100A may comply with the USB-PD standard. The so-called "support standards" includes not only the case where the certification test of the standard is passed (conforming) but also the case where the authentication is not passed, but the equivalent function can be provided (compatible). The first port P1 and the second port P2 may be USB-Type C ports.

When the battery 102 is two cells, the battery voltage $V_{BAT}$ is 3.7 V×2≈7.4 V. On the other hand, according to the USB-PD standard, a bus voltage $V_{BUS}$ in the range of 5 V to 20 V is used. Therefore, by using the boost/buck converter, it is possible to support the bus voltage $V_{BUS}$ of 5 to 20 V.

The Second Embodiment

Figure 10:
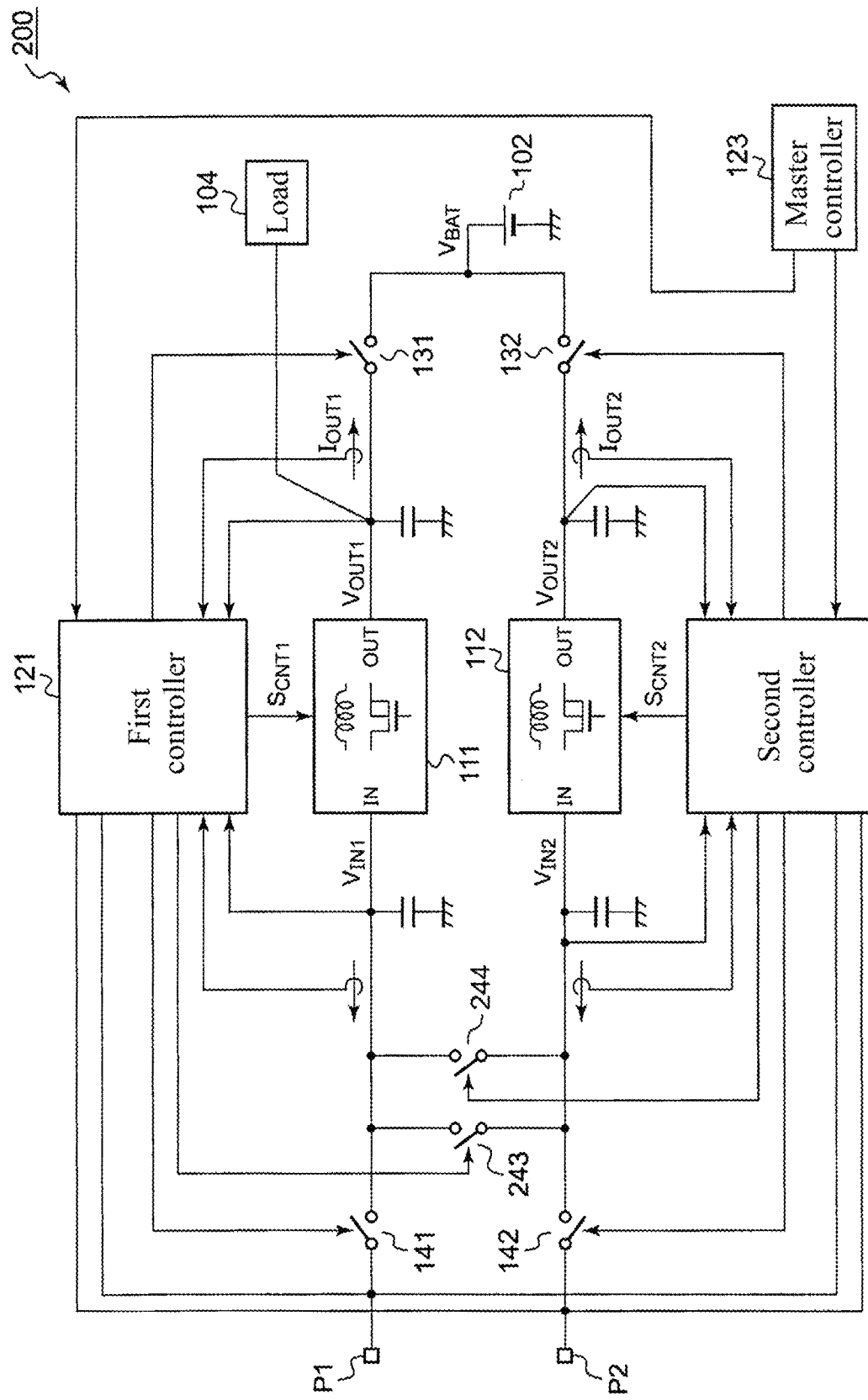
FIG. 10 is a block diagram of an electronic device according to a second embodiment of the present disclosure.

FIG. 10 is a block diagram of an electronic device 200 according to the second embodiment. The electronic device 200 comprises, in addition to the electronic device 100 of FIG. 1, a third input switch 243 and a fourth input switch 244. The third input switch 243 is provided between the input IN of the first switching converter 111 and the input IN of the second switching converter 112. The fourth input switch 244 is provided in parallel with the third input switch 243 and between the input IN of the first switching converter 111 and the input IN of the second switching converter 112.

The first controller 121 is further configured to control the third input switch 243, and the second controller 122 is further configured to control the fourth input switch 244.

Now that the structure of the electronic device 200 has been described, the action performed by the electronic device is discussed below. The electronic device 200 supports all the operation modes described in connection with FIG. 2 to FIG. 8. Additionally, or alternatively, as a substitution to some of the operation modes, the electronic device 200 supports the eighth operation mode MODE8 to the tenth operation mode MODE10.

(The Eighth Operation Mode)

The eighth operation mode MODE8 is selectable under the first state φ1.

Figure 11:
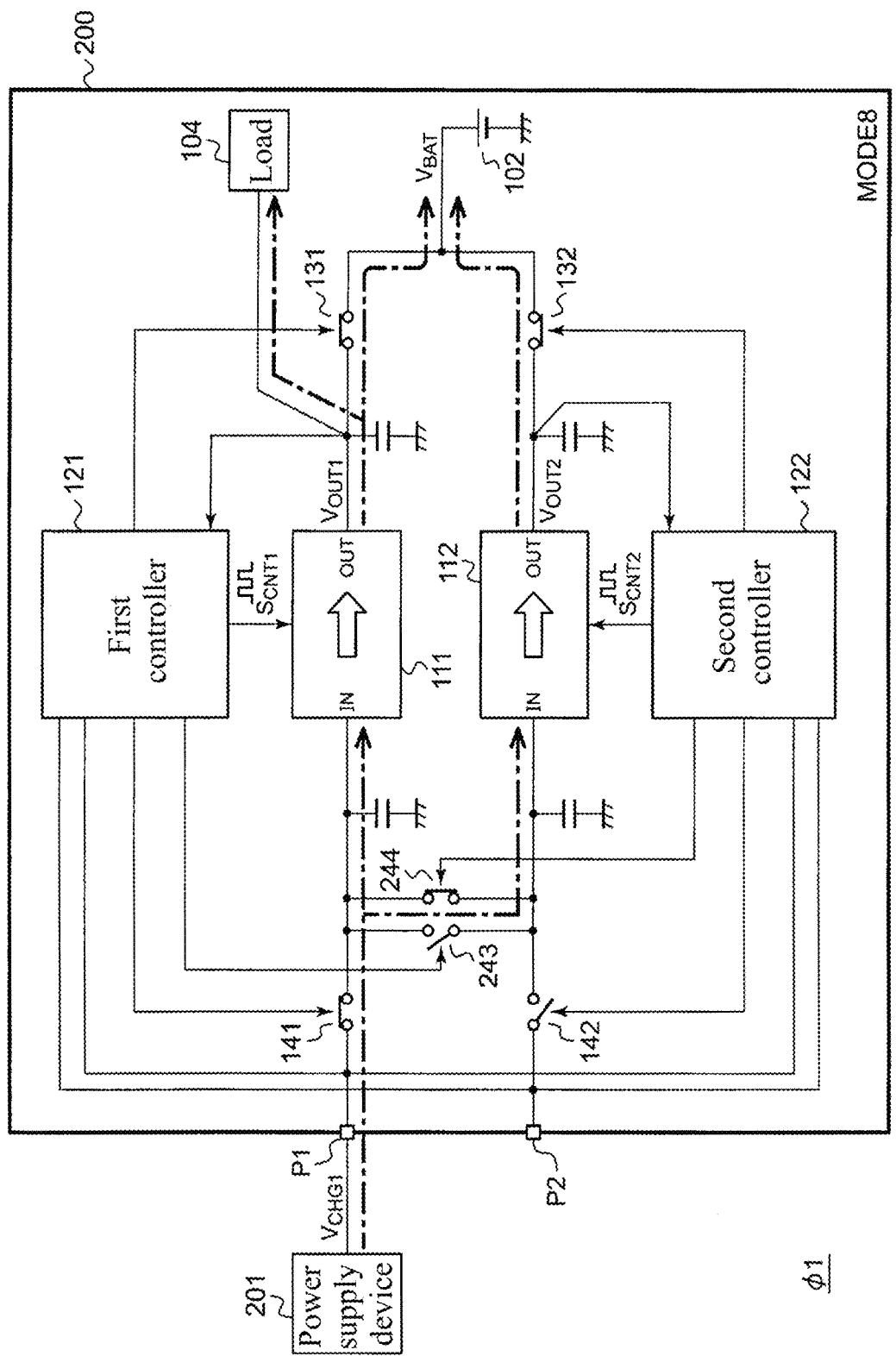
FIG. 11 is an equivalent-circuit diagram of an electronic device under an eighth operation mode.

FIG. 11 is an equivalent-circuit diagram of an electronic device 200 under the eighth operation mode. The eighth operation mode is selectable under the first state φ1. The eighth operation mode MODE8 is also referred to as the single-port input high-current charging operation mode. The eighth operation mode MODE8 is also referred to as the single-port input high-current operation mode.

The first controller 121 turns on the first input switch 141 and the first load switch 131. The second controller 122 turns off the second input switch 142 and turns on the second load switch 132.

Under the eighth operation mode MODE8, one or both of the third input switch 243 and the fourth input switch 244 are turned on. As shown in FIG. 11, the fourth input switch 244 is turned on.

The action of the first switching converter 111 is the same as those described in connection with FIG. 2. The charging voltage $V_{CHG1}$ is supplied to the input IN of the second switching converter 112 via the first input switch 141 and the fourth input switch 244. The second controller 122 makes the second switching converter 112 operate in the forward mode, so that the output OUT of the second switching converter 112 generates the output voltage $V_{OUT2}$. The output of the second switching converter 112 is connected to the battery 102 via the second load switch 132. The battery 102 is charged using both the first switching converter 111 and the second switching converter 112.

According to the electronic device 200, two switching converters operate in parallel, so that a larger current can be used to charge the battery 102.

For example, assume that the maximum rated current of each of the first switching converter 111 and the second switching converter 112 is 5 A. Under the operation mode of FIG. 2, even when the power supply device 201 has a current capacity of 10 A, the charging current is limited to 5 A by the first switching converter 111. On the other hand, according to the operation mode (single-port input high-current charge mode) in FIG. 10, it is possible to charge the battery 102 at a current of 10 A (The Ninth Operation Mode)

Figure 12:
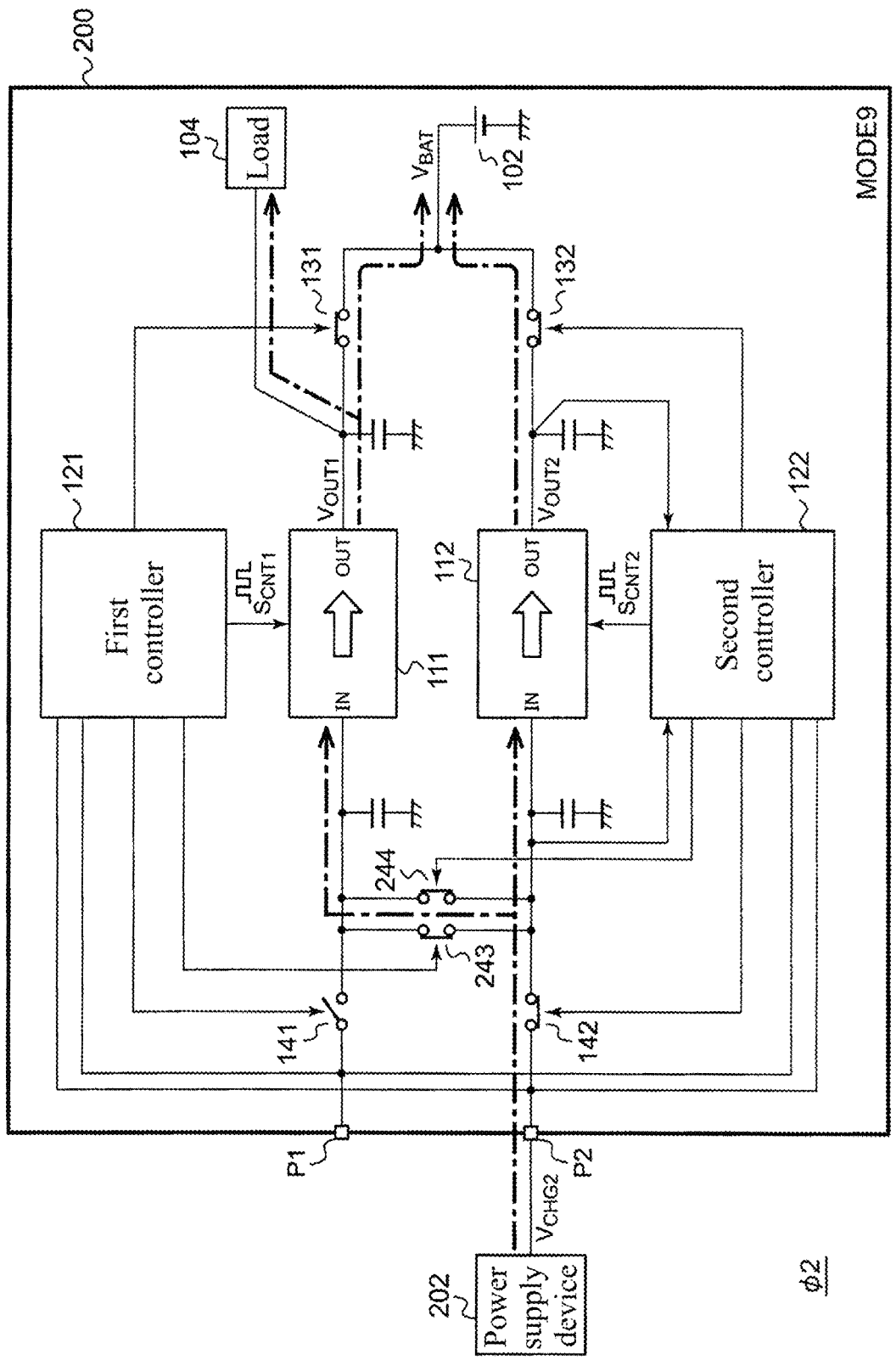
FIG. 12 is an equivalent-circuit diagram of an electronic device under a ninth operation mode.

FIG. 12 is an equivalent-circuit diagram of an electronic device 200 under the ninth operation mode. The ninth operation mode MODE9 is selectable under the second state $\varphi 2$. Under the ninth operation mode MODE9, the first input switch 141 is turned off, and the second input switch 142 is turned on, and the others are the same as the eighth operation mode MODE8. Under the ninth operation mode MODE9, at least one of the third input switch 243 and the fourth input switch 244 is turned on.

Like the eighth operation mode MODE8, the ninth operation mode MODE9 can also be referred to as a single-port input high-current charging operation mode, which may charge the battery 102 with a larger current.

(The Tenth Operation Mode)

Figure 13:
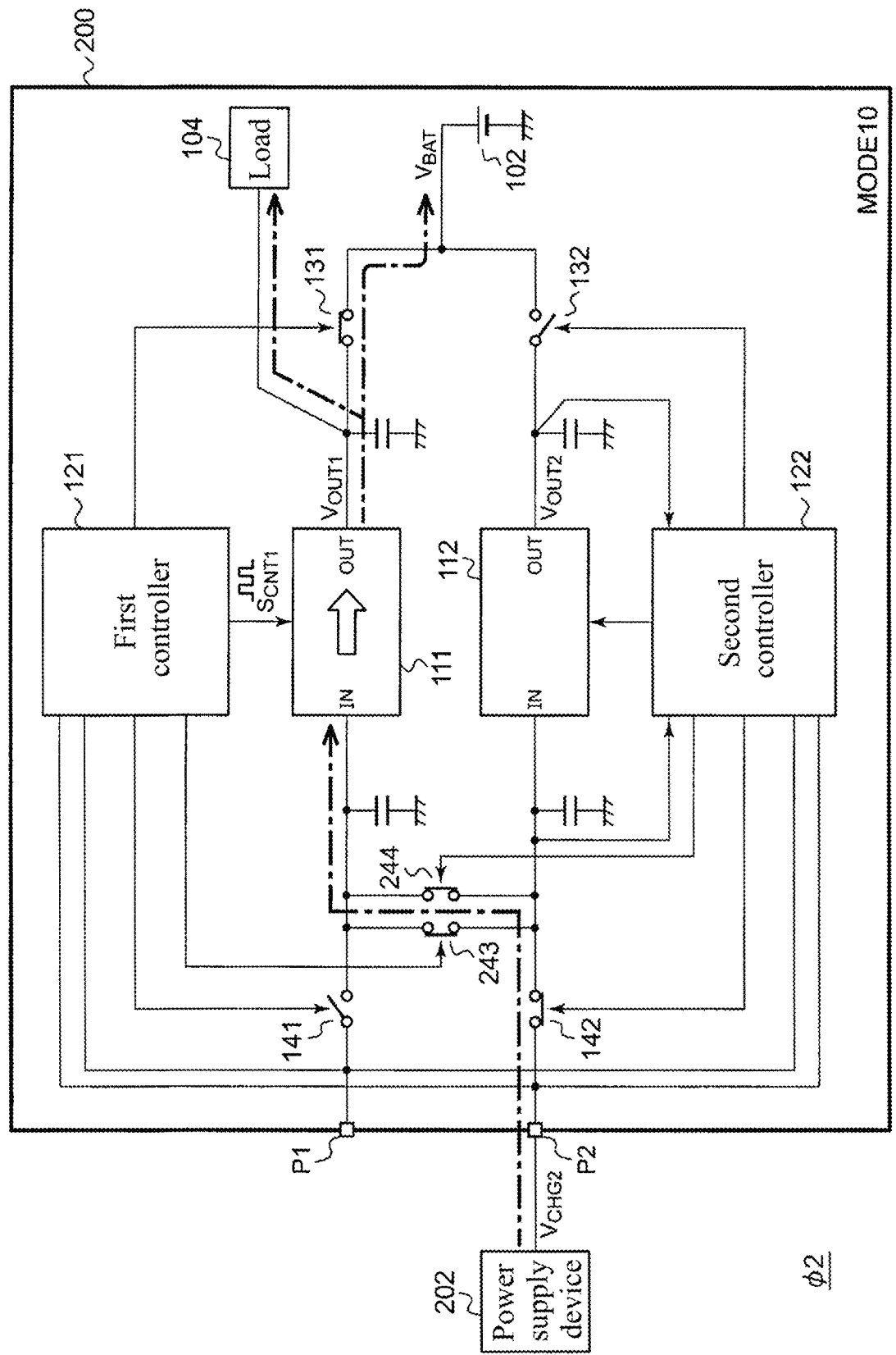
FIG. 13 is an equivalent-circuit diagram of an electronic device under a tenth operation mode.

FIG. 13 is an equivalent-circuit diagram of an electronic device 200 under the tenth operation mode. The tenth operation mode MODE10 is selectable under the second state $\varphi 2$.

Under the tenth operation mode MODE10, the second switching converter 112 is stopped, and the second load switch 132 is turned off. The power is supplied to the load 104 via the first switching converter 111, and the battery 102 is only charged using the first switching converter 111, too.

The tenth mode MODE10 of FIG. 13 and the second mode MODE2 of FIG. 3 are compared. Under the second mode MODE2, three switches (142, 132, 131) are connected in series between the second port P2 and the load 104. On the other hand, under the tenth mode MODE10, the number of switches between the second port P2 and the load 104 can be reduced to two (142, 244), thereby reducing the power loss.

Figure 14:
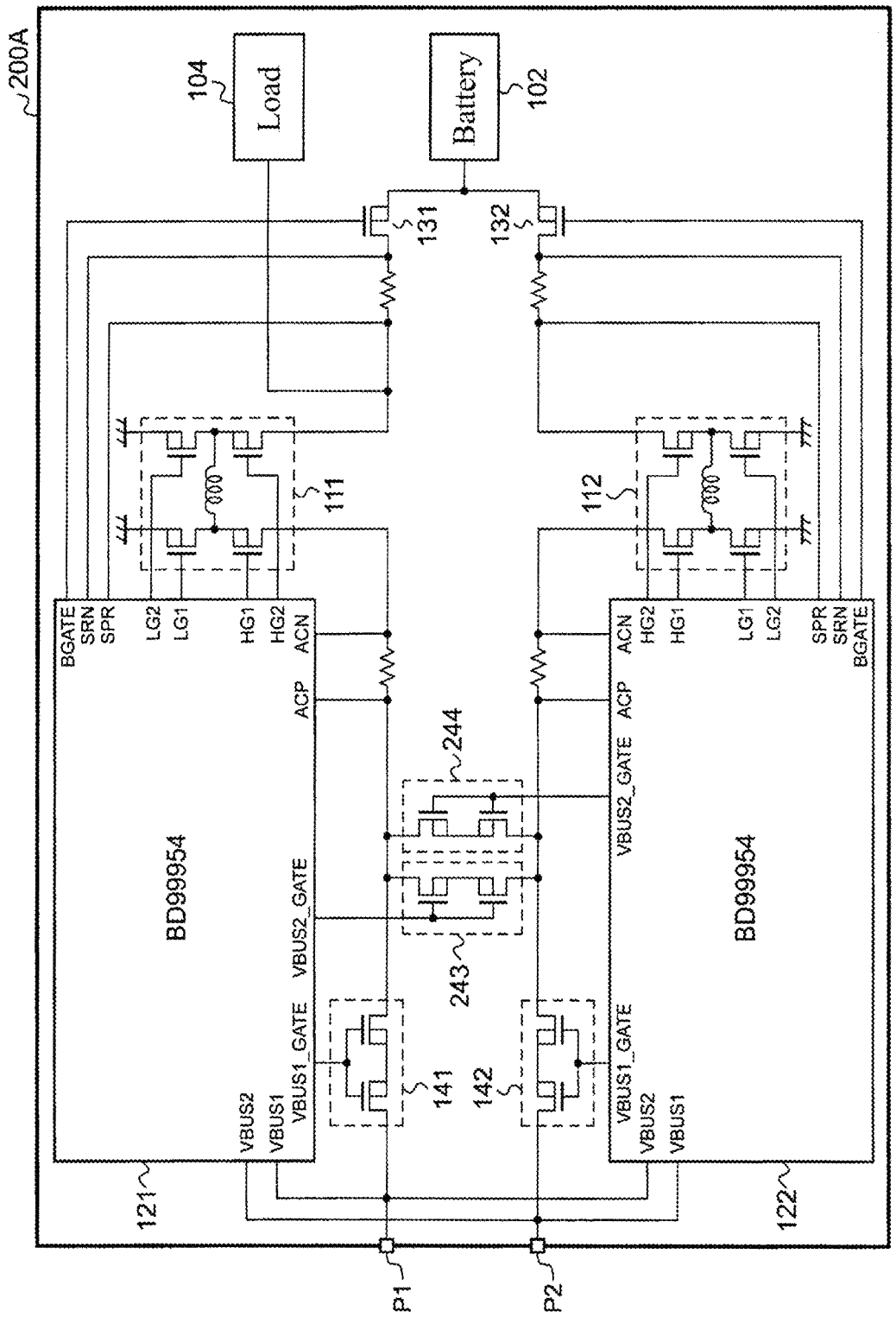
FIG. 14 is a circuit diagram of an electronic device according to one embodiment.

Next, a specific configuration example of the electronic device 200 will be described. FIG. 14 is a circuit diagram of an electronic device 200A according to one embodiment. The third input switch 243 includes two N-channel MOS transistors connected in series. The same applies to the fourth input switch 244. Other configurations are the same as those of the electronic device 100A of FIG. 9.

The embodiments of the present invention have been described above. This embodiment is an example, and as could be appreciated by persons having ordinary skill in the art, various modifications can be made to the combination of each constituent element and each processing procedure. Also, such modifications are within the scope of the present invention. Hereinafter, such a modified example will be described.

The electronic device 100 may support all of the first operation mode MODE1 to the seventh operation mode MODE7, but some operation modes may be omitted. Similarly, the electronic device 200 may support all of the first operation mode MODE1 to the tenth operation mode MODE10, but some operation modes may be omitted.

The present invention has been discussed with a certain degree of particularity based on embodiments thereof; however, these embodiments only disclose the principles of the present invention, and the applications of these embodiments allow for various variations or alterations of the configuration without departing from the spirit or scope of this invention as defined by the appended claims.

What is claimed is:

1. An electronic device, comprising:
   a first port;
   a second port;
   a first switching converter, having an output connecting to a load;
   a second switching converter;
   a first input switch provided between the first port and an input of the first switching converter;
   a second input switch provided between the second port and an input of the second switching converter;
   a first load switch provided between the output of the first switching converter and a battery;
   a second load switch provided between an output of the second switching converter and the battery;
   a first controller, configured to control the first switching converter, the first input switch, and the first load switch; and
   a second controller, configured to control the second switching converter, the second input switch, and the second load switch,
   wherein the first load switch, the second load switch and the battery are connected at the same node.

2. The electronic device of claim 1, wherein when the second port is connected to a power supply device, then the second input switch, the second load switch, and the first load switch are on, thereby enabling a selection for an operation mode of the second switching converter.

3. The electronic device of claim 1, wherein when the first port is connected to a power supply device and the second port is connected to a power receiving device, then the first input switch, the second input switch, the first load switch, and the second load switch are on, thereby enabling a selection for an operation mode of the first switching converter and the second switching converter.

4. The electronic device of claim 1, wherein when the first port is connected to a power receiving device and the second port is connected to a power supply device, then the first input switch, the second input switch, the first load switch, and the second load switch are on, thereby enabling a selection for an operation mode of the first switching converter and the second controller.

5. The electronic device of claim 1, wherein when the first port is connected to a power supply device and the second port is connected to a power supply device, then the first input switch, the second input switch, the first load switch, and the second load switch are on, thereby enabling a selection for an operation mode of the first switching converter and the second controller.

6. The electronic device of claim 1, wherein when the first port is connected to a power receiving device and the second port is connected to a power receiving device, then the first input switch, the second input switch, the first load switch, and the second load switch are on, thereby enabling a selection for an operation mode of the first switching converter and the second controller.

7. The electronic device of claim 1, further comprising:
a third input switch provided between the input of the first switching converter and the input of the second switching converter; and
a fourth input switch provided in parallel with the third input switch and between the input of the first switching converter and the input of the second switching converter;
wherein the first controller further controls the third input switch, and the second controller further controls the fourth input switch.

8. The electronic device of claim 7, wherein when the first port is connected to a power supply device, then the first input switch, the first load switch, and the second load switch are on, and at least one of the third input switch and the fourth input switch is on, thereby enabling a selection for an operation mode of the first switching converter and the second controller.

9. The electronic device of claim 7, wherein when the second port is connected to a power supply device, then the second input switch, the first load switch, and the second load switch are on, and at least one of the third input switch and the fourth input switch is on, thereby enabling a selection for an operation mode of the first switching converter and the second controller.

10. The electronic device of claim 7, wherein when the second port is connected to a power supply device, then the second input switch and the first load switch are on, and at least one of the third input switch and the fourth input switch is on, thereby enabling a selection for an operation mode of the first switching converter.

11. The electronic device of claim 1, wherein the first switching converter and the second switching converter are buck-boost converters.

12. The electronic device of claim 1, wherein the first port and the second port support the USB-PD specification.

* * * * *